United States Patent [19]

Hogan et al.

[11] 4,072,852
[45] Feb. 7, 1978

[54] DIGITAL COMPUTER MONITORING AND RESTART CIRCUIT

[75] Inventors: James A. Hogan, Hatfield; Morton Sklaroff, Fort Washington, both of Pa.

[73] Assignee: Honeywell Inc., Minneapolis, Minn.

[21] Appl. No.: 716,709

[22] Filed: Aug. 23, 1976

[51] Int. Cl.² ............................................. G06F 11/04
[52] U.S. Cl. .................................. 235/303.1; 364/900
[58] Field of Search ........ 235/153 AK, 153 A, 153 R; 340/172.5

[56] References Cited

U.S. PATENT DOCUMENTS

| | | | |
|---|---|---|---|
| 3,229,251 | 1/1966 | Homan et al. | 235/153 A |
| 3,517,171 | 6/1970 | Avizienis | 235/153 X |
| 3,749,897 | 7/1973 | Hirvela | 235/153 AK |
| 3,795,800 | 3/1974 | Nimmo et al. | 235/153 AK |
| 3,868,647 | 2/1975 | Zanoveld | 340/172.5 |

*Primary Examiner*—Joseph F. Ruggiero
*Attorney, Agent, or Firm*—Laurence J. Marhoefer; Lockwood D. Burton; Mitchell J. Halista

[57] ABSTRACT

A digital computer monitoring and restart circuit monitors the presence of periodic output signals from the digital computer by a missing pulse detector. When the detector senses a missing output signal from the computer, it indicates this detection operation by an output signal representation of the fact that the computer is not operating. In response to this output signal a restart pulse is generated by a restart pulse generator and is applied to the computer to restart the computer and to reset the monitoring circuit. Concurrently, a 5-second timer circuit is started. While the timer circuit is operating over its 5-second interval, if the monitoring circuit produces another output signal indicating that the computer is not operating, the 5-second timer is stopped and another restart operation is not attempted. If the 5-second timer is allowed to run to the end of the 5-second interval without the detection of a computer outage, the monitoring and restart circuit is reset by the 5-second timer to an initial state indicative of the continuing operation of the computer while awaiting a subsequent computer outage.

6 Claims, 1 Drawing Figure

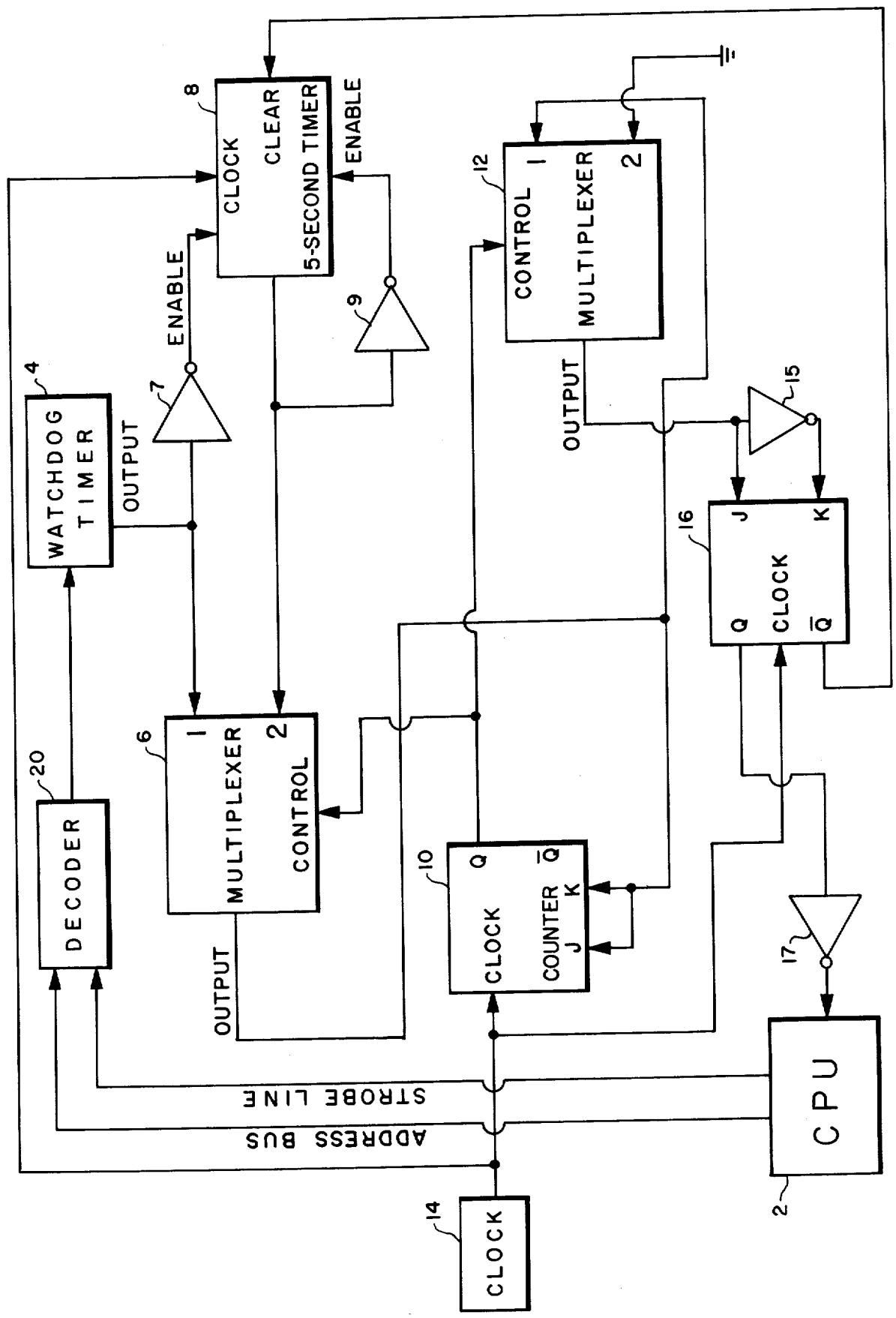

DIGITAL COMPUTER MONITORING AND RESTART CIRCUIT

BACKGROUND OF THE INVENTION

1. Field of the Invention

The present invention relates to digital computers. More specifically, the present invention is directed to a monitoring and restart circuit for a digital computer's central processing unit (CPU).

2. Description of the Prior Art

A digital computer may unintentionally stop executing instructions due to a power line transient signal or other external disturbance causing the computer to incorrectly interpret an instruction as a "halt" instruction or causing the program counter to advance, or jump, and produce an address for an area of memory where the program being executed is not stored. Additionally, a loss of power may cause the digital computer to stop operating. On the other hand, a digital computer may stop itself for a valid reason, such as when a self-diagnostic routine fails. In order to differentiate between a valid stoppage of the computer and an erroneous or invalid stoppage it is necessary to apply a known operational state to the computer to induce a response which can be checked against the normal operation of the computer. Since the digital computer particularly in a process control application may be in an unattended location, it is desirable to have a monitoring and restart operation available for automatic and immediate use in the event of a computer outage. In the event of a transient stoppage of the computer, such an automatic restart will enable a process control computer to continue its control function while obviating the need for an operator to visit the computer site.

SUMMARY OF THE INVENTION

An object of the present invention is to provide an improved computer monitoring circuit for determining the validity of a digital computer stoppage.

Another object of the present invention is to provide an improved computer monitoring circuit for effecting an automatic restart operation in response to the detection of a computer stoppage.

In accomplishing these and other objects, there has been provided, in accordance with the present invention, a digital computer monitoring and restart circuit for monitoring the operation of a digital computer and providing a restart operation of a digital computer following an outage thereof. The monitoring and restart circuit includes a detector circuit for detecting an outage or inoperative state of the digital computer by monitoring periodic program generated computer output signals to detect a missing predetermined number of the computer output signals. Upon the detection of missing computer output signals, the detector circuit produces an output signal to start a time period measuring circuit and to energize a restart signal generating means. The restart signal generated by the restart signal generating means is applied to the digital computer to restart the operation thereof and to reset the detector circuit to terminate its output signal. If the detector circuit subsequently detects another computer outage before the end of the time period being measured, the time period measured is interrupted and another restart operation is not initiated. On the other hand, if the limit of the time period is reached without the detection of another computer outage, the restart signal generating means is reset to await the detection of another computer outage by the detector circuit.

BRIEF DESCRIPTION OF THE DRAWINGS

A better understanding of the present invention may be had when the following detailed description is read in connection with the accompanying drawing, in which the single FIGURE is a block diagram representation of a monitoring and restart circuit for a digital computer embodying the present invention.

DESCRIPTION OF THE PREFERRED EMBODIMENT

Detailed Description

Referring to the single FIGURE drawing in more detail, there is shown a digital computer as represented by a central processing unit, or CPU 2. The CPU 2 may be any conventional digital computer system that includes means for storing and reading a predetermined program for directing the internal functions of the CPU 2. The CPU program is arranged to include a step for sending a periodic pulse to a so-called "watchdog timer" 4 which is a missing pulse detector that is arranged to produce a characteristic output signal in the event that one or more of periodic input pulses are missing. This step in the CPU program is repeated at predetermined intervals to effect the production of the periodic pulse at a desired frequency, e.g., 3 Hz.

The "watchdog" timer 4 may be any suitable pulse detector circuit capable of producing an output signal upon the occurrence of a missing pulse in a series of regularly spaced input pulses, such devices being well known in the art. The timer 4 can, for example, have a flip-flop in its output circuit whereby a change in state of the flip-flop produce a level change at a preselected flip-flop output. The output signal from the watchdog timer 4 is applied to a first input of a first multiplexer 6. An output signal from the watchdog timer 4 representative of the presence of the output signals from the CPU 2 is also applied as an enabling signal through a logical inverter 7 to a first "enable" input of a duration measuring circuit, e.g., a 5-second timer 8 with the duration being longer than the program execution time of the CPU 2. The 5-second timer 8 can be a four-bit counter such as an SN74161-TTL circuit sold by Texas Instruments of Houston, Tex. An output signal from the timer 8 is applied to a second input of the multiplexer 6 and, through a logical inverter 9, to a second enable input of the timer 8. An output signal from the first multiplexer 6 is applied as an "enable" signal to the combined J-K input of a first J-K flip-flop counter 10 and a first input of a second multiplexer 12. A clock signal generator circuit 14 is arranged to provide a clock signal at a predetermined frequency, e.g., 3 Hz, to be counted by the counter 10 and the 5-second timer 8.

An output signal from the counter 10 is applied as a control signal to concurrently switch the first multiplexer 6 and the second multiplexer 12. A second input of a second multiplexer 12 is connected to a ground connection to apply a fixed reference signal level thereto. An output signal from the second multiplexer 12 is applied as an "enable" signal directly to the J-input and, through an inverter 15, to the K-input of a second J-K flip-flop counter 16. In integrated TTL circuits, sold by Texas Instruments, Houston, Tex., the multiplexers 6 and 12 could be a known unit identified as an SN74157 while the counters 10 and 16 could each be an SN74111. The clock input of the second counter 16 is connected to the clock signal generator 14. The "Q" output of the second counter 16 is applied through a logical inverter 17 as a "restart" signal to the restart circuit of the CPU 2. The $\overline{Q}$ output of the second counter 16 is applied as "clear" signal to the 5-second timer 8. The restart circuit of the CPU 2 may be any suitable internal circuit which is capable of initiating a start program operation within the CPU 2, e.g., load "start" address code into a program counter to restart the reading of the stored program in the computer memory. Since the stored program includes the steps of sending periodic pulses to the watchdog timer 4, this timer is reset, or cleared, by a restart of the computer program.

The restart circuit of the CPU 2 may be simply a connection of the restart line from the inverter 17 to a line of a CPU data bus, e.g., the 12th line of a 16 line data bus. The application of the restart signal to this data bus produces a code on the data which is the program start code. This address start code produces a reading of the program memory, e.g., a read-only-memory (ROM) at the first step of the stored program. Similarly, the stored program steps for operating the watchdog timer 4 each produce an address code for the watchdog timer 4 which is treated as a peripheral device. The timer 4 would be connected to a decoder 20 which is used to decode the address code from the CPU 2 and gate an internally generated strobe signal from the CPU 2 to the timer 4. The storage of computer programs, the reading of stored computer programs, the use of data and address busses and the generation of internal CPU strobe signals are all conventional digital computer techniques performed by known CPU products. Accordingly, the further elaboration of the details of these techniques beyond the aforesaid discussion is believed to be unnecessary. In other words, the use of a standard CPU product such as the CP-1600 manufactured by General Instruments Corp. of Hicksville, N.Y., with the fixed wiring of the restart line described above along with a suitable stored program will provide the aforesaid CPU structure for the CPU 2. Further, the decode circuit 20 and the monitoring and restart circuit of the present invention can be located adjacent to the CPU 2 to minimize the length of the address bus and strobe signal line.

MODE OF OPERATION

The operation of the monitoring and restart circuit shown in the single FIGURE drawing provides a restart operation for the CPU 2 after the detection of a stoppage of the CPU 2. If the CPU stoppage is for a valid reason, the restart circuit will obviously be ineffective in restarting the operation of the CPU 2. On the other hand, if the stoppage of the CPU 2 is a product of a transient condition causing an unintentional stopping of the CPU 2, the restart circuit will attempt to restart the CPU 2. In other words, if the CPU 2 stops again after a restart operation it is assumed that either the stoppage was a valid one or the restart circuit is ineffective to overcome the cause of the unintentional stoppage of the CPU 2, e.g., a CPU power failure. In either case, the monitoring and restart circuit of the present invention takes no further action. If, however, the CPU is operating again before the end of a predetermined time period, e.g., 5 seconds, it is assumed that the CPU stoppage was due to a temporary disturbance, and the monitor and restart circuit is reinitialized to continue the monitoring operation of the CPU 2.

The monitor and restart circuit of the present invention is initiated into operation by the watchdog timer 4 which monitors the CPU program initiated periodic output pulses from the CPU 2. The output signal from the timer 4 which is applied to a first input of the first multiplexer 6 is arranged to be initially in a logical "0," or a low level state, if the monitored periodic output signals from CPU 2 are present, e.g., the CPU 2 is running. The initial state of the multiplexer 6 is arranged to apply this low level output signal from the timer 4 to the "enable" or combined J-K input of the counter 10 and to a first input of the second multiplexer 12. When the timer 4 detects a missing CPU output signal, its output signal goes high, i.e., to a logical "1" state. The high output signal from the timer 4 is applied through the first and second multiplexers 6 and 12 to the J-input of the second counter 16. This high level signal enables the second counter 16 to change its state with the next clock signal from the clock signal generator 14. Assuming the counter 16 was originally in a low level "Q" output state, the change in state produces a high level "Q" output state. This high level output signal is inverted by the third inverter 17 and is applied as a "restart" signal to the CPU 2 to provide a restart operation therein. Concurrently, the low level "$\overline{Q}$" output of the counter 16 is applied as a "clear" signal to the timer 8 to clear it for further counting.

The further operation of the circuit involves the preparation of the circuit for the monitoring of the CPU 2 during the restart operation. Specifically, the high output signal from the timer 4 enables the counter 10 to advance to a logical "1" state by counting a next pulse from the clock 14. The logical "1" state provides a high level output signal from the "1" output of the counter 10. The high level "1" output signal from the counter 10 is applied as a control signal to the second multiplexer 12 to switch its output line to its second input line which is connected to a ground reference level. The low level output signal on the output of the second multiplexer 12 produced by the ground reference level is inverted by the inverter 15 and is applied as an input enable signal to the K-input of the second J-K counter 16. The K-input enabling signal allows the second counter 16 to again change state by counting a next clock signal from the clock generator 14. Accordingly, the Q output of the second counter 16 now goes low and $\overline{Q}$ output goes high to terminate the "restart" signal to the CPU 2 and the "clear" signal to the timer 8, respectively.

As previously mentioned, the watchdog timer circuit 4 is also cleared by restarting of the CPU program by the "restart" signal to bring its output signal back to a low level state. This low level state is inverted by the first logical inverter 7 to a high level signal which is applied as an "enable" signal to a first "enable" input of the 5-second timer 8. The second "enable" input of the timer 8 receives a high level input from the second inverter 9 which inverts the cleared low level timer output signal, i.e., the output signal from the timer 8 is a low level signal when the timer 8 is counting to provide the aforesaid high level input signal to the second "enable" input. When the two "enable" inputs to the timer 8 are receiving high level inputs, the timer 8 counts the signals from the clock 14 for a maximum of 5 seconds.

The high level "1" output signal from the counter 10 is also applied to the first multiplexer 6 to switch its output line to its second input line which is connected to an output of the 5-second timer 8. Since the output signal from the timer 8 is a low level signal until the timer 8 has completed its count, this low level signal is ineffective to enable a change in the state of the counter 10. Accordingly, the multiplexers 6 and 12 are retained in their former states. However, the continued high level signal applied to the "restart" line of the CPU 2 has no further effect and the circuit of the present invention is now temporarily held in a fixed state representative of the fact that the restart operation was tried and a monitoring operation was reinstated to detect the effect of restarting the CPU 2. While the counter 10 is in a high level, or logical 1, state, if the output signal from the watchdog time 4 becomes high again to indicate the detection of another missing CPU pulse, the 5-second timer 8 is stopped to indicate that the CPU is not running. Specifically, the high level output signal from the watchdog timer 4 is inverted and is applied as a low level signal to the associated enable input of the five-second timer 8. Since both enable inputs of the timer 8 are not high level signals, the timer 8 stops counting. No further restart operations of the CPU 2 are attempted.

If the watchdog timer output signal remains low indicative of an operating CPU, the 5-second timer 8 is allowed to run out to the end of the five-second interval since both of its "enable" input signals remain high. When the 5-second timer 8 reaches a full count, the output signal from the timer 8 goes high. This high level output signal is applied through the first multiplexer 6 to the combined J-K "enable" input of the counter 10 to enable the counter 10 to count another clock signal from the clock 4. This counting operation of the counter 10 changes its output stages to produce a low level on its "1" output. The termination of the high level input signal to the control inputs of the first and second multiplexers 6 and 12 allows them to switch their outputs to their first input lines, respectively. Thus, the first multiplexer 6 is restored to having its output line connected to its first input line whereby the monitoring of the state of the watchdog timer is resumed while the second multiplexer 12 is reset to prepare for the possible generation of another "restart" signal by the counter 16 following the detection of another CPU outage, as discussed above. Accordingly, the circuit is reinitialized for further stoppages only if the monitoring operation indicates that the CPU 2 is operating at the end of the 5-second. In other words, the reinitialization of the circuit enables the monitoring and restart operation to be applied to the further operation of the CPU 2 if the 5-second interval is allowed to pass without a detection of stoppage of the CPU 2 while the monitoring and restart operation is inhibited if a stoppage of the CPU is detected before the end of the 5-second interval. Thus, the circuit provides an automatic monitoring and restart function for a digital computer CPU while inhibiting the monitoring and restart operation for a CPU which has not restarted in response to a restart operation following the detection of a CPU outage.

Accordingly, it may be seen that there has been provided, in accordance with the present invention, a monitoring and restart circuit for automatically monitoring a digital computer and providing a restart operation for the digital computer following an outage thereof.

The embodiments of the invention in which an exclusive property or privilege is claimed are as follows:

1. A method of monitoring the operation of a digital computer comprising the steps of detecting the presence of periodic output signals from the digital computer generated in response to a computer program, generating a restart signal if a predetermined number of said output signals is missing, applying the restart signal to the digital computer to restart the operation thereof, concurrently starting a predetermined time interval measurement to generate a control signal at the end of said time interval, detecting the presence of said output signals from the computer following the application of said restart signal to the digital computer and interrupting said measurement of said time interval to inhibit the generation of said control signal as an indication of a continued improper computer operation upon the detection of further missing ones of said output signals from the digital computer.

2. A method as set forth in claim 1 and including the further step of resetting a restart pulse generating circuit by said control signal following a completion of said time interval measurement.

3. A method as set forth in claim 1 wherein said predetermined number is one and said time interval is 5 seconds.

4. A digital computer monitoring and restart circuit comprising,
a signal monitoring means for detecting computer output signals generated in response to a computer program to produce an output signal representative of a missing predetermined number of the computer output signals,
restart signal generating means connected to said monitoring means and arranged to generate a restart signal in response to said output signal from said monitoring means,
means for applying said restart signal to said digital computer to produce a restart operation, said monitoring means being reset by said output signals from said digital computer produced by said restart operation to terminate said output signals from said monitoring means,
time period measurement means connected to said monitoring means and said restart signal generating means and responsive to said resetting of said monitoring means and to said restart operation to initiate a measurement of a predetermined time period and to generate a control signal at the end of said time period, and
means to interrupt said time period measurement to inhibit the generation of said control signal as an indication of a continued improper computer operation upon the production of said output signal by said monitoring means during said time interval.

5. A digital computer monitoring and restart circuit as set forth in claim 4 and further including means connected to said control signal from said time period measurement means produced at the end of said time period to reset said restart signal generating means.

6. A digital computer monitoring and restart circuit as set forth in claim 4 wherein said predetermined number is one and said time period is 5 seconds.

* * * * *